United States Patent [19]
Takase et al.

[11] Patent Number: 5,138,159
[45] Date of Patent: Aug. 11, 1992

[54] SCANNING TUNNELING MICROSCOPE

[75] Inventors: Tsugiko Takase; Takao Okada, both of Hachioji, Japan

[73] Assignee: Olympus Optical Co., Ltd., Tokyo, Japan

[21] Appl. No.: 727,005

[22] Filed: Jul. 8, 1991

[30] Foreign Application Priority Data

Jul. 20, 1990 [JP] Japan .................. 2-190705

[51] Int. Cl.$^5$ ............................................. H01J 37/26
[52] U.S. Cl. ........................................ 250/306; 250/307
[58] Field of Search ................................ 250/306, 307

[56] References Cited

U.S. PATENT DOCUMENTS

| | | | |
|---|---|---|---|
| 4,604,520 | 8/1986 | Pohl | 250/216 |
| 4,837,435 | 6/1989 | Sakuhara et al. | 250/306 |
| 4,918,309 | 4/1990 | Beha et al. | 250/306 |
| 4,985,627 | 1/1991 | Gutierrez et al. | 250/306 |

OTHER PUBLICATIONS

J. Appl. Phys. 59 (10), May 15, 1986; "Near-field Optical-scanning Microscopy"; by U. Durig et al.; pages 3318-3327.

Primary Examiner—Jack I. Berman
Attorney, Agent, or Firm—Frishauf, Holtz, Goodman & Woodward

[57] ABSTRACT

White light emitted from a light source is made incident on a spectroscope via a lens. The light from the spectroscope is converged by a lens and fed to one end of an optical fiber. The other end of the fiber is provided with a probe. The probe has a pointed end portion coated with a total reflection film and a transparent electrically conductive film. The probe is attached to a cylindrical piezoelectric actuator via a metal frame. Thus, the probe is scanned along the surface of a sample, and the distance between the probe and the surface of the sample is controlled. The light emitted from the tip of the probe and transmitted through the sample is converged by a lens system and radiated on a photoelectrical conversion element. The output from the photoelectrical conversion element is processed by a signal processor, and the processed result is displayed on a display. A driver circuit scans the probe along the surface of the sample, and controls the distance between the probe and the sample upon receiving a tunnel current. The output from the driver circuit is processed by the signal processor and an STM image is displayed on the display.

8 Claims, 5 Drawing Sheets

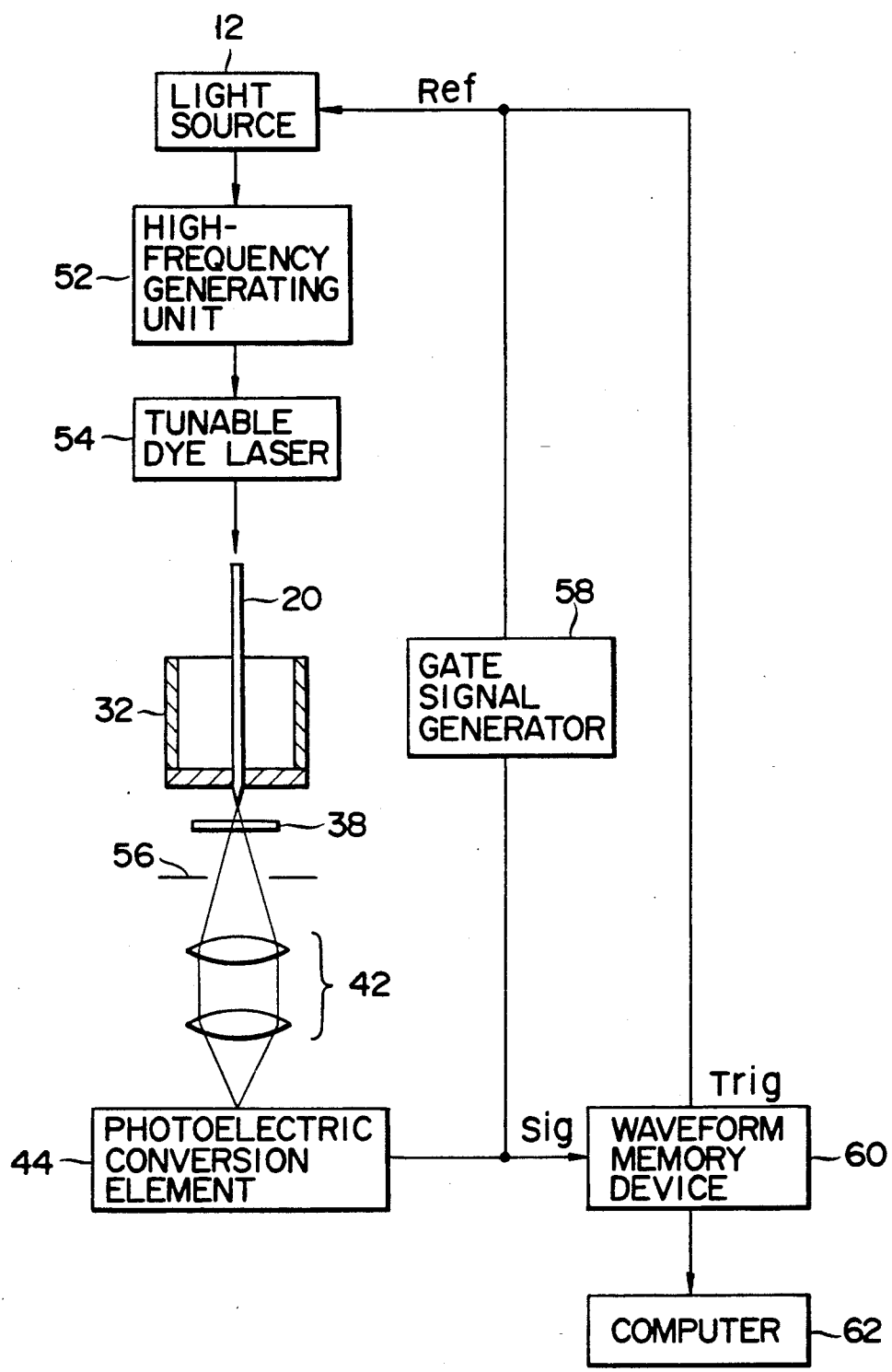
F I G. 4

SCANNING TUNNELING MICROSCOPE

BACKGROUND OF THE INVENTION

1. Field of the Invention

The present invention relates to a scanning tunneling microscope (STM).

2. Description of the Related Art

An attempt has been made to simultaneously measure the optical characteristic and STM image of the surface of a sample and obtain the data relating to the electronic state, lattice vibration, etc. of the sample surface, for example, the structure and energy state density.

For this purpose, an optical microscope-integrated STM, for example, has been proposed. In this STM, a probe is attached to a transparent plate, and the center axis of the probe is made to agree with the optical axis of a sample observation optical system. Thus, the sample surface can be observed by the STM while the sample surface can be optically observed through the transparent plate. In addition, if a spectroscope is provided, the optical characteristics of the sample surface, e.g. absorption, reflection and light emission, can be measured.

In the optical microscope-integrated STM, however, when the optical characteristics of the sample surface are analyzed by using the spectroscope or the like to enhance the wavelength resolution, only average optical characteristics of the entire optical visual field ar measured. Thus, the horizontal resolution of the optical image decreases remarkably. In addition, when the sample surface is optically excited by light emitted from an objective lens and a resultant tunnel current is detected, it is not possible to optically excite only the sample surface (in a range of about 10 nm$^2$) near the region where tunnel current is detected.

There has been proposed another apparatus, a near-field optical-scanning microscope (NFOSM). The NFOSM is described in detail in "J. Appl. Phys.," Vol. 59, No. 10, 15 May 1986, pp. 3318-3327. FIG. 3 of this document illustrates the principle of this apparatus. In FIG. 3, a crystal tip has one end portion with a radius of curvature of 30 nm, and this end of the tip is provided with a light-transmission hole. The hole is formed by coating the tip with Cr, Ag or Al and then with Au and thereafter pressing the tip on a glass surface When a laser beam is introduced from the other end portion of the tip, the beam is diffracted by the light-transmission hole and is radiated outward while flaring. According to the NFOSM, the sample and the transmission hole are sufficiently approached and the sample is observed by utilizing the diffracted light. Compared to an optical microscope, a higher horizontal resolution ($\sim\lambda/20$) is obtained. In the NFOSM, an STM is used for positional control in the z-direction perpendicular to the sample surface. Accordingly, using an STM an optical image with high horizontal resolution (absorption, reflection, light emission) and an STM image can be obtained simultaneously.

When optical measurement and STM measurement of the sample surface are carried out by use of the NFOSM, light is radiated from the light-transmission hole at the end portion of the tip, as shown in FIG. 5 of the aforementioned document, while a tunnel current flows through an Au film near the light-transmission hole. Thus, the location for detecting the optical characteristic does not coincide with the location for detecting the STM image. Consequently, the location where light excitation takes place differs from the location where tunnel current is detected, and it is almost impossible to detect a light-excited tunnel current.

SUMMARY OF THE INVENTION

The object of the present invention is to provide an apparatus capable of measuring optical characteristics of a sample, such as absorption, reflection and light emission, with a horizontal resolution of about 10 nm to 100 nm, and observing an STM image at the same location as the location where the optical characteristics are measured.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 shows the structure of a scanning tunneling microscope according to still another embodiment of the invention.

DETAILED DESCRIPTION OF THE PREFERRED EMBODIMENTS

Embodiments of the STM according to the present invention will now be described with reference to the accompanying drawings.

Figure 1:
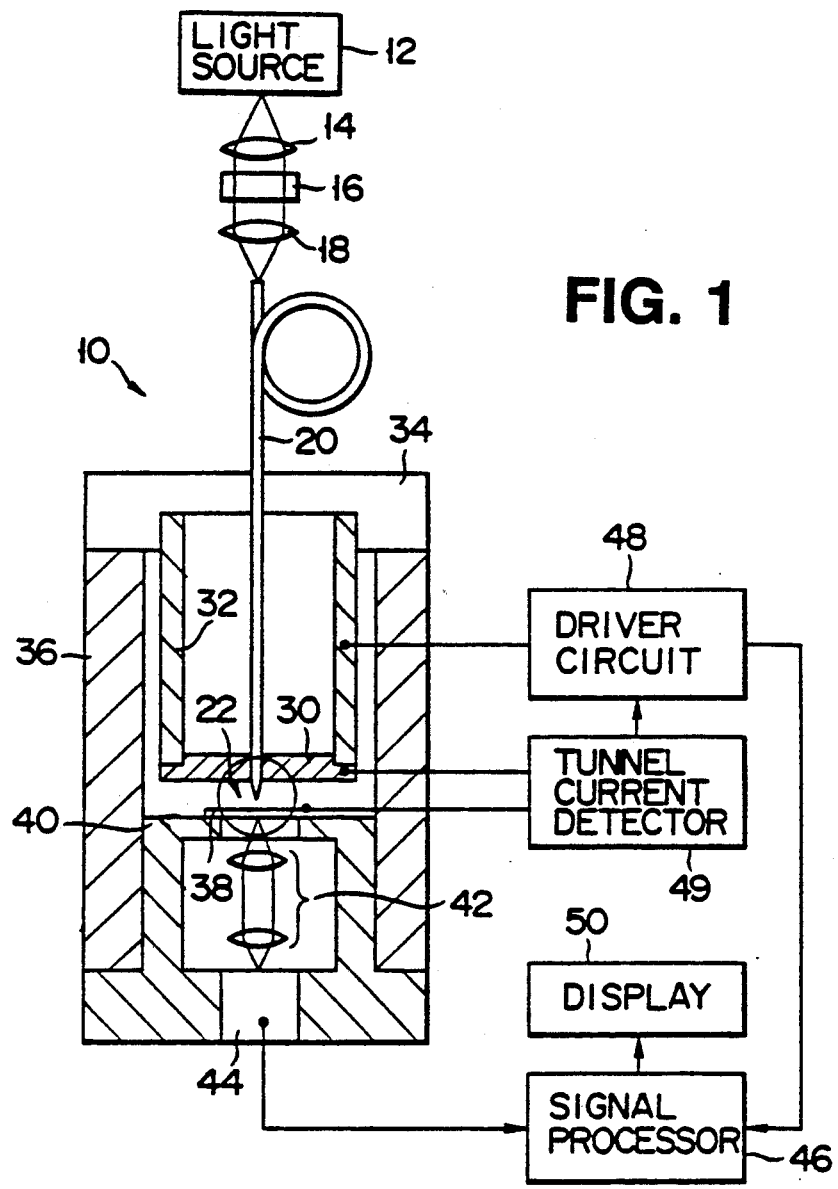
FIG. 1 shows the structure of a scanning tunneling microscope according to an embodiment of the present invention.
Figure 1A:
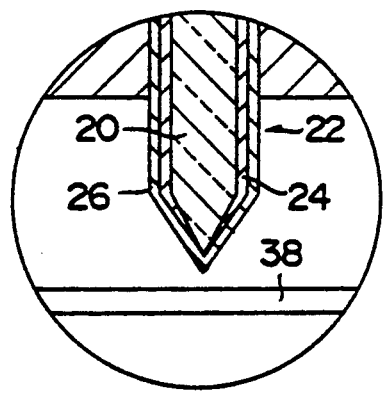
FIG. 1A shows an enlarged portion of the structure of FIG. 1.

As is shown in FIGS. 1 and 1A, apparatus 10 has a stationary white light source 12, such as a tungsten lamp, a high-pressure mercury lamp, a blackbody radiation source, or a xenon lamp. White light emitted from the light source 12 is made incident on a spectroscope 16 through a lens 14. The light from the spectroscope 16 is converged through a lens 18 and introduced into one end portion of an optical fiber 20. The other end portion of the optical fiber 20 is connected to a probe for simultaneously carrying out NFOSM measurement and STM measurement. The probe 22 is constituted, for example as shown in FIG. 1A, such that a pointed tip portion of the fiber 20 is coated with a total-reflection film 24 and a transparent electrically conductive film 26.

Figure 2A:
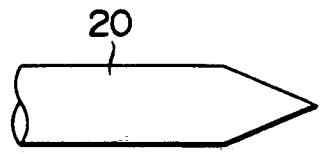
FIG. 2A to FIG. 2D illustrate a method of manufacturing a probe used in the microscope shown in FIG. 1.
Figure 2B:
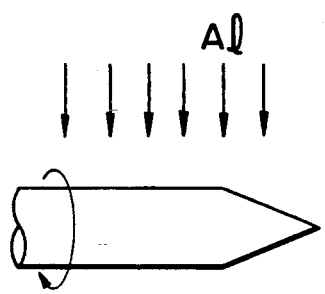
Figure 2C:
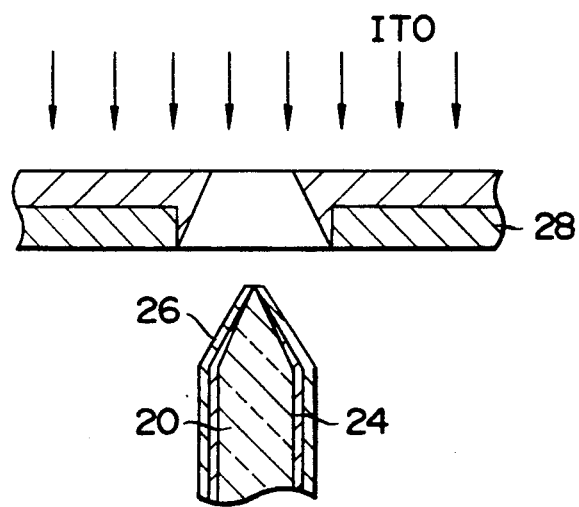
Figure 2D:
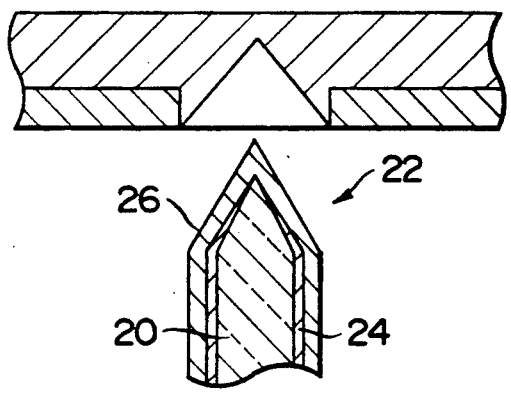

An example of a method of manufacturing the probe 22 will now be described with reference to FIGS. 2A to 2D. An end portion of quartz fiber 20 is etched with hydrofluoric acid. Thus, a tip portion with a pointed end is formed, as shown in FIG. 2A. It is desirable that the tip portion be tapered with a radius of curvature of about 10 nm so that it can effectively function as a light emission end for NFOSM measurement. Subsequently, as shown in FIG. 2B, while the fiber 20 is being rotated, Al is vacuum-deposited on the side face of the fiber 20. As a result, the total-reflection film 24 is formed on the side surface of the fiber including at least the tapered tip portion. In this case, attention should be paid so as not to attach Al to the tip portion of the fiber 20. The optical fiber 20 and a mask 28 having a circular opening above the tip portion of the fiber 20 are arranged within a sputtering apparatus. As shown in FIG. 2C, ITO is deposited on the fiber 20 from above via the mask 28. The deposition is continued until the opening in the mask 28 is closed with ITO, as shown in FIG. 2D. Thus, the conical transparent conductive film 26 having a pointed tip portion is formed at the tip portion of the fiber 20. The obtained probe 22 has, as a result, a light-transmission hole with a diameter of about 10 nm at its tip end. The light propagated through the optical fiber 20 is emitted from the light-transmission hole.

Referring to FIG. 1, the probe 22 is fixed to a cylindrical piezoelectric actuator 32 via a metal frame 30. The actuator 32 is of a conventional type and functions to finely move the probe 22 in three-dimensional directions. The actuator 32 is driven by a pulse motor or a DC motor, and is supported by a z-directional rough-movement mechanism 34 fixed to a metal casing 36. A sample table 40 for supporting a sample 38 has, in its center portion, an opening or a transparent plate for transmitting light. A photoelectric conversion element 44, such as a photomultiplier, a photodiode or a PIN photodiode, is situated below the sample table 40 via a lens system 42 for converging light that has passed through the sample 38. The photoelectric conversion element 44 is connected to a display 50, such as a video monitor or a CRT, via a signal processor 46. The display 50 shows NFOSM measurement results. The apparatus 10 includes a tunnel current detector 49 and a driver circuit 48. The tunnel current detector 49 applies a voltage across the probe 22 and sample 38, and detects a tunnel current flowing across the probe 22 and sample 38. The driver circuit 48 enables the cylindrical piezoelectric actuator 32 to scan the probe 22 in xy-directions parallel to the sample surface, and controls the z-directional position of the probe 22 on the basis of the output from the tunnel current detector 49. The driver circuit 48 is also connected to the display 50 via the signal processor 46. The display 50 shows an STM image formed on the basis of the voltage applied from the driver circuit 38 to the cylindrical piezoelectric actuator 32.

It will now be described how measurement is carried out. While a predetermined voltage is applied between the probe 22 and the sample 38 by the tunnel current detector 49, the probe 22 is approached to the sample 38 by means of the z-directional rough movement mechanism 34. Just when a tunnel current begins to flow across the probe 22 and the sample 38, the rough movement mechanism 34 is stopped. At this time, the tunnel current flows between the sample 38 and the tip (i.e. a tip portion of the transparent conductive film 26) of the probe 22. Subsequently, using the driver circuit 48, a predetermined voltage is applied to a drive electrode (not shown) of the cylindrical piezoelectric actuator 32 and the probe 22 is scanned in the xy-directions over the surface of the sample 38. During this, the driver circuit 48 adjusts the drive voltage for the piezoelectric actuator 32 so as to keep constant the tunnel current detected by the tunnel current detector 49, and feedback-controls the z-directional position of the probe 22. In the course of these sequential operations, the STM image of the sample 38 is constructed by the signal processor 46 on the basis of the voltage applied to the actuator 32, and the STM image is displayed on the display 50.

On the other hand, while the probe 22 is scanned in the xy-directions, the light for NFOSM measurement is made incident on the optical fiber 20 from the light source 12. The light introduced into the fiber 20 is radiated on the sample 38, while it is diffracted from the light-transmission hole at the tip of the probe 22. The light passing through the sample 38 is radiated on the photoelectric conversion element 44. On the basis of the light radiated on the conversion element 44, NFOSM images representing light absorption by the sample and/or light emission from the sample are formed by the signal processor 46 and displayed on the display 50.

According to this apparatus 10, the probe 22 is provided with the pointed tip portion formed of transparent conductive film 26 and the tunnel current flows from this tip portion. Thus, the NFOSM measurement location agrees with the STM measurement location. Accordingly, the local optical characteristics of the sample can be carried out along with the STM measurement, and the spatial distributions of various optical characteristics can be measured.

Further, according to the apparatus 10, the wavelength of excitation light radiated from the light source 12 is made variable, and the spatial distribution of the absorption spectrum and light-emission excitation spectrum of the sample 38 can be measured. In addition, by measuring the light emitted from the sample 38 by means of a spectroscope, the spatial distribution of light-emission spectrum can be measured. By detecting a tunnel current while radiating excitation light, STM measurement based on a tunnel current occurring by the light excitation can be performed. By altering excitation light wavelength successively, the spatial distribution of the tunnel current corresponding to the excitation spectrum can be measured. Furthermore, local STS (Scanning Tunneling Spectroscopy) measurement and STP (Scanning Tunneling Potentiometry) based on light radiation can be carried out by monitoring tunnel current while controlling the current applied to the probe 22 and sample 38 or while providing a voltage gradient to the sample 38.

If a mechanical chopper for intermitting light is provided between the lens 18 and optical fiber 20, light absorption and light emission of the sample 38 ca be measured simultaneously. In this case, a photoelectric conversion signal is fed to a lock-in amplifier in synchronism with the cycle of the intermittent light. In this case, the photoelectric signal which is in-phase with the intermittent light is the light absorption signal representing light absorption of the sample, and the photoelectric signal which is out-of-phase with the intermittent light is the light emission signal (representing a light component having a relatively long light emission lifetime). The light emission life-time of the sample can be estimated from the phase difference between the excitation light and the emitted light.

It is possible to use, as a photoelectric conversion element, a light-measuring system (e.g. simultaneous light-measuring system manufactured by HAMAMATSU PHOTONICS, CO.) constituted by combining an optical grating and a 1 st-order diode array. Thereby, emitted light components having different wavelengths can be detected simultaneously.

If wavelength characteristic is not so important or if light passing through the sample is intense, the lens system 42 may not be provided; instead, the photoelectric conversion element 44 may be provided directly on the rear surface of the sample or thereabouts. In this case, by attaching a two-dimensional light sensor directly on the rear surface of the sample, the spatial distribution of the light emission itself can be measured, and data relating to diffusion of excision occurring by excitation of the sample can be obtained.

Figure 3:
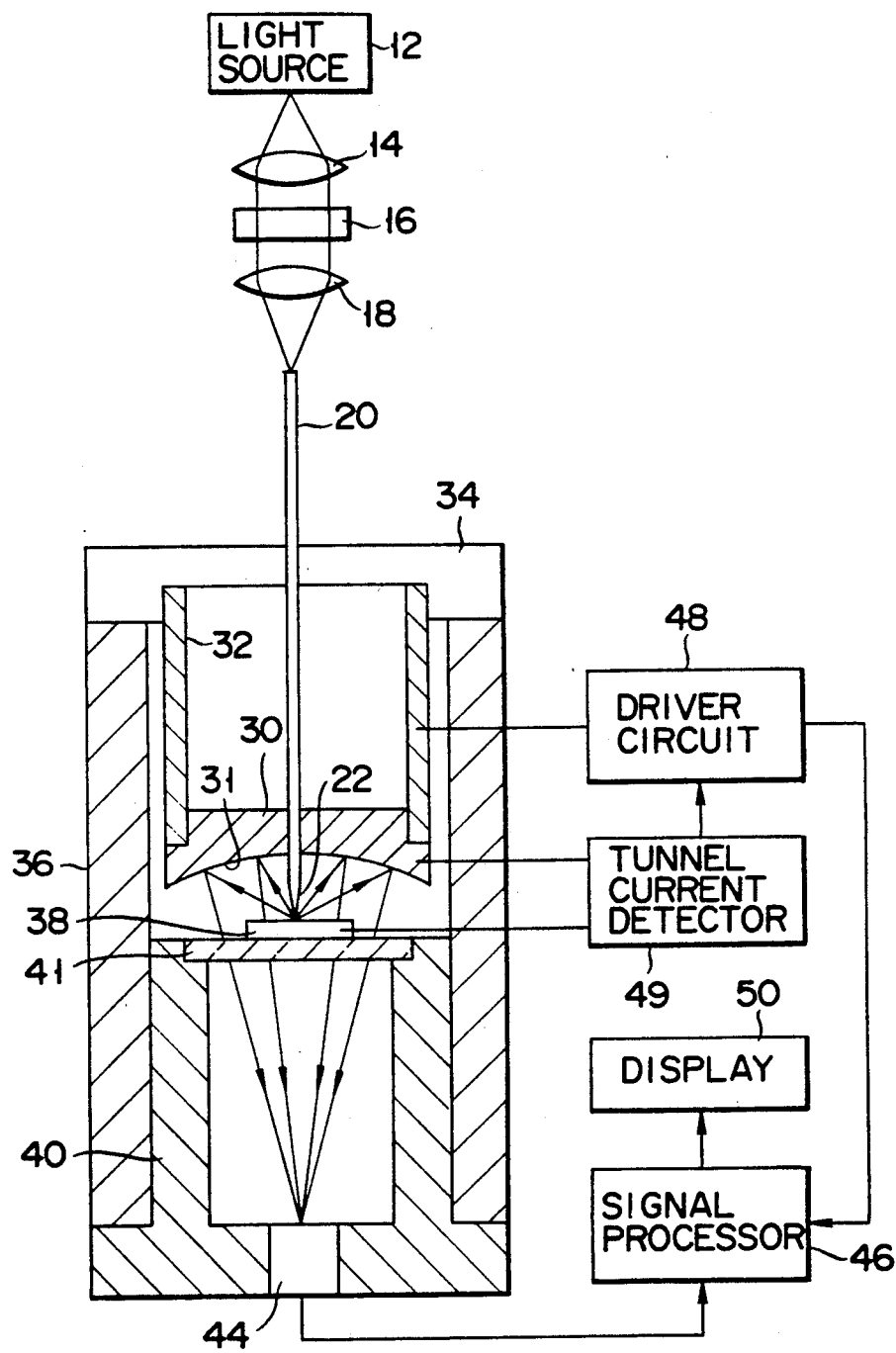
FIG. 3 shows the structure of a scanning tunneling microscope according to another embodiment of the invention.

Referring to FIG. 3, another embodiment of the invention will now be described. Common structural elements with the preceding embodiment are denoted by like reference numerals, and a description thereof is omitted. In this embodiment, the observation of STM images is carried out in the above-described manner, and a description thereof is omitted.

According to this embodiment, a sample table 40 has a transparent plate 41 made of glass or quarts. A sample 38 is placed on the transparent plate 41. The surface of the transparent plate 41 may be coated with a transparent electrode of ITO, etc., taking into account the voltage application to the sample. A metal frame 30 for holding the probe 22 has a concave mirror 31 on its surface facing the sample 38. The focal point of the concave mirror 31 is located on a photoelectric conversion element 44.

According to this embodiment, light (and emitted light on the sample surface) radiated from the tip of the probe 22 and reflected by the surface of the sample 38 is reflected by the concave surface 31. The reflected light passes through the peripheral portion of the transparent plate 41 around the sample 38 and is converged on the photoelectric conversion element 44. The signal from the conversion element 44 is processed by a signal processor 46 and an NFOSM image is displayed on a display 50.

According to the apparatus of this embodiment, it is possible to measure the spatial distribution of the reflection spectrum of light reflected by the sample surface and the spatial distribution of the light emission spectrum of light emitted from the sample surface. In this case, by subjecting the reflection spectrum to Kramers-Kronig conversion, the absorption spectrum of the sample surface can be estimated. The absorption spectrum is more effective than the transmission absorption spectrum in the case of the sample having a high absorption coefficient. Compared to the light emission spectrum obtained by utilizing the light that has passed through the sample, the re absorption effect due to the sample can be disregarded, and a spectrum closer to the inherent light emission spectrum of material can be obtained.

The optical system shown in FIG. 3, which is designed to detect reflection light from the sample surface, is capable of observing a weak tunnel emission light detected on the sample surface. The tunnel emission light is the light emitted when tunnel current flows. In this case, not only the simple tunnel emission light but also the tunnel emission light excited by radiation light from the probe can be detected.

The method of detecting the tunnel emission light with high precision will now be described. In FIG. 3, the xy-coordinates of the probe 22 are fixed. A DC bias voltage is applied to the sample 38. When a tunnel current is detected, the servo circuit is held, and the z-directional position of the probe 22 is fixed. Thereafter, a rectangular wave bias voltage is applied to the sample, and a tunnel emission light signal synchronized with the bias voltage is detected by a lock in amplifier. This operation is repeated at each point on the sample surface while moving the probe 22. Thereby, the spatial distribution of the tunnel emission light can be measured with high precision. Further, by measuring the light emitted from the sample by means of a spectroscope, the spatial distribution of the tunnel emission light spectrum can be determined with high precision.

FIG. 4 shows still another embodiment of the invention, which is capable of directly measuring the aforementioned emission light life-time. The basic structure of this embodiment is similar to that of the embodiment of FIG. 1. Thus, only different points will be described.

In this embodiment, a mode lock YAG laser is used as a light source 12. A high-frequency generating u it 52 capable of generating a second or a third high frequency is provided on the rear stage of the light source 12. The light from the source 12 is converted to light of less wavelength. A tunable dye laser 54 capable of varying wavelength is provided on the rear stage of the high-frequency generating unit 52. Thereby, wavelength-variable excitation light pulses having a pulse width of a sub-nano second are repeatedly generated and guided into the optical fiber 20.

Figure 5:
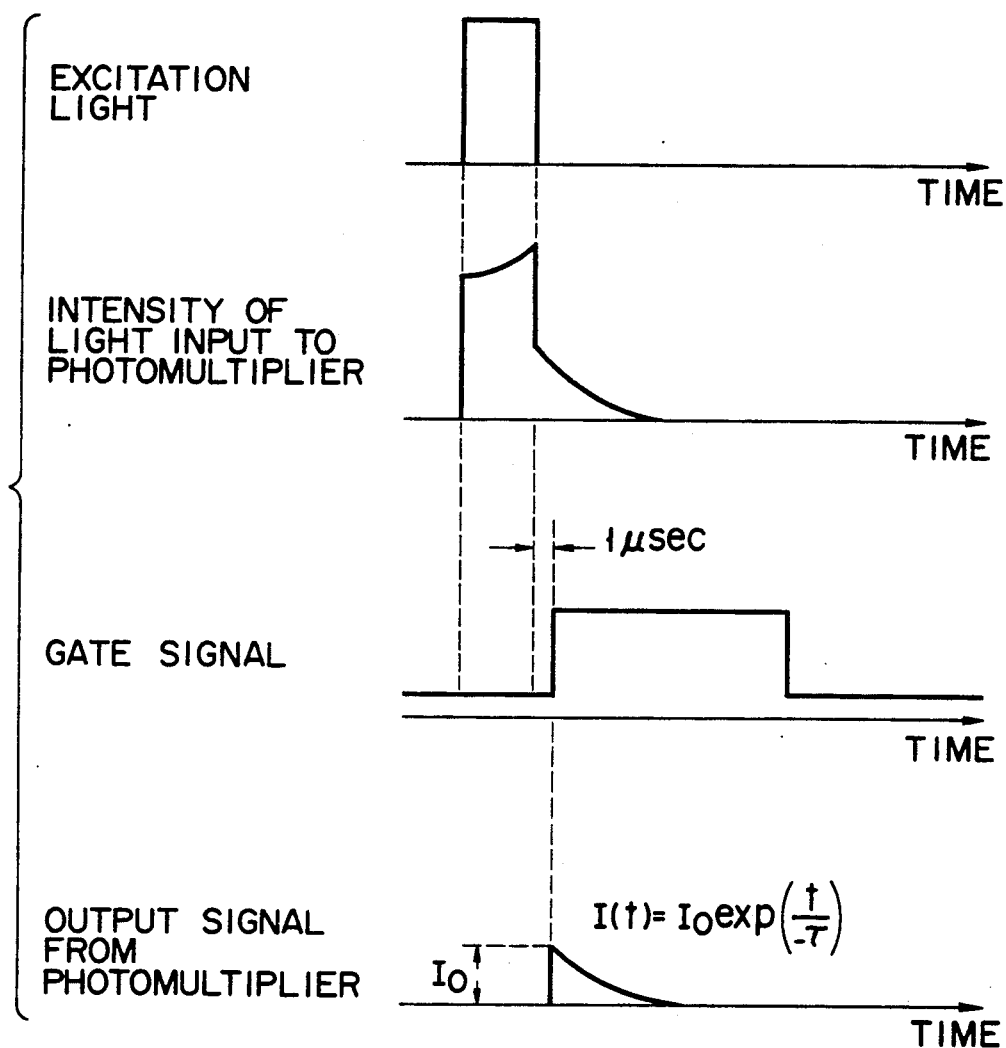
FIG. 5 shows timing charts illustrating the relationships of an excitation light pulse, a gate signal, an input signal to a photomultiplier, and an output signal from the photomultiplier, with the passing of time.

A space filter 56 for spatially cutting excitation light is provided between the sample 38 and the lens system 42. A center range of about 50 microns of the space filter 56 serves as an optical trap, and it absorbs most of excitation light. Accordingly, most of the light that has passed through the space filter 56 is an emission light component, and it is made incident on a photoelectric conversion element 44 via a spectroscopic system, etc. In this case, what is used as conversion element 44 is a photomultiplier with a gate circuit. Only when a gate signal is supplied from a gate signal generator to the photoelectric multiplier, a voltage is applied to the first-stage electrode of the photomultiplier and a photoelectric conversion output is generated. As a result, an excitation light component and a light emission component are separated in terms of time. In this case, the gate signal generator 58 is adjusted such that the gate is opened just after (e.g. 1 μsec after) the excitation light pulse is input, as shown in the timing chart of FIG. 5. The obtained photoelectric conversion signal (i.e. signal of emission light component) is synchronized with laser oscillation and is supplied to a computer 62 via a waveform memory device 60 or an A/D converter.

It is well known that the waveform of the photoelectric conversion output from the photomultiplier, which is derived by the gate signal, is given by $$I(t) = I_o \exp(-t/\tau)$$

where $I(t)$ is the waveform of a photoelectric conversion output of emission light, and $I_o$ is the initial value of output.

From the above equation, an emission light life-time $\tau$ is calculated.

According to this apparatus, the time-dependency of the emission light intensity in the case where the sample is excited by pulse-like excitation light is measured, thereby obtaining data relating to the relaxation of excited state (emission light life-time). Furthermore, by scanning the probe in the xy-plane, the spatial distribution of the emission light life-time can be measured.

According to the structure of FIG. 4, the tunnel current signal is recorded in the waveform memory device 60 in synchronism with the laser oscillation of the light source 12. Thereby, the time-dependency of the tunnel current intensity at the time of exciting the sample by pulse light can be measured. Accordingly, there can be obtained data relating to the relaxed state of charge associated with electric conduction, or the spatial distribution of the relaxed state of charge.

The present invention is not limited to the above embodiments and various changes and modifications can be made without departing from the subject matter and spirit of the present invention. For example, regarding the method of manufacturing the probe 22, the optical fiber is not limited to the quartz glass fiber, and a multicomponent glass fiber or a plastic fiber may be substituted. Any type of fiber capable of guiding waves having wavelengths of light from the light source can be used. The pointed tip portion of the optical fiber may be formed by mechanical polishing. The material of the reflection film 24 is not limited to Al; Cr, Ag, Au, etc. may be used, if the film can reflect waves of wavelengths of light emitted from the light source. Not only ITO but also $SnO_2$, etc. may be used as material of the transparent electrically conductive film, if the material can transmit the waves of wavelengths of light from the light source and it has electrical conductivity. In addition, the total reflection film 24 and the transparent conductive film 26 may be laminated on the side face of the optical fiber 20 in the reverse order.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A scanning tunneling microscope comprising: a probe including
   a tapered end portion,
   a light incidence section,
   a light propagation medium with a light emission portion at the tip of the tapered end portion, said light emission portion allowing the incident light to be emitted, and
   an electrically conductive layer provided near the tapered end portion and having a transparent electrical conductor with an optically transparent pointed tip portion through which light from the light emission portion passes;
   a light source;
   guide means for guiding light from the light source to the light incidence section of the probe;
   scanning means for supporting the probe in the vicinity of a sample, thereby radiating the light from the light emission portion onto the sample, and for scanning the probe along the surface of the sample;
   a photoelectrical conversion element receiving the light from the sample;
   tunnel current detecting means for applying a voltage across the probe and the sample and detecting a tunnel current flowing across the probe and the sample;
   control means for controlling the distance between the tip of the probe and the surface of the sample; and
   measuring/displaying means for measuring optical characteristics of the sample on the basis of the output from the photoelectrical conversion element, measuring a fine configuration and electrical characteristics of the surface of the sample on the basis of the output from the tunnel current detecting means, and displaying the measurement results.

2. The scanning tunneling microscope according to claim 1, wherein said light propagation medium is an optical fiber having a pointed tip portion.

3. The scanning tunneling microscope according to claim 2, wherein said electrically conductive layer includes a reflection layer provided on the peripheral surface of the light propagation medium, said reflection layer reflecting light which travels from the inside of the light propagation medium to the outside thereof.

4. The scanning tunneling microscope according to claim 2, further comprising an optical element having conjugation points at a portion of the sample at the tip of the probe and the photoelectrical conversion element.

5. The scanning tunneling microscope according to claim 4, wherein said optical element is a concave mirror.

6. The scanning tunneling microscope according to claim 1, wherein the light source is a pulse driven laser, said microscope has a wavelength variable element, and said photoelectrical conversion element is operated in synchronism with pulses.

7. The scanning tunneling microscope according to claim 6, wherein said pulse driven laser includes a high-frequency generating unit for generating a high frequency of an emission light wavelength.

8. The scanning tunneling microscope according to claim 6, wherein said wavelength variable element is a tunable dye laser.

* * * * *